(12) United States Patent
Reed et al.

(10) Patent No.: US 7,218,751 B2
(45) Date of Patent: May 15, 2007

(54) GENERATING SUPER RESOLUTION DIGITAL IMAGES

(75) Inventors: Alastair M. Reed, Lake Oswego, OR (US); Brett T. Hannigan, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 774 days.

(21) Appl. No.: 09/895,063

(22) Filed: Jun. 29, 2001

(65) Prior Publication Data
US 2003/0002707 A1   Jan. 2, 2003

(51) Int. Cl.
G06H 9/00 (2006.01)
(52) U.S. Cl. .................. 382/100; 382/294; 382/284
(58) Field of Classification Search ............. 382/100, 382/284, 287, 294, 299; 348/36, 38
See application file for complete search history.

(56) References Cited

U.S. PATENT DOCUMENTS

| | | | |
|---|---|---|---|
| 5,748,783 A | 5/1998 | Rhoads | |
| 5,767,987 A * | 6/1998 | Wolff et al. .................. | 358/447 |
| 5,832,119 A * | 11/1998 | Rhoads ......................... | 382/232 |
| 6,122,403 A | 9/2000 | Rhoads | |
| 6,208,765 B1 * | 3/2001 | Bergen ......................... | 382/268 |
| 6,385,329 B1 | 5/2002 | Sharma et al. | |
| 6,466,253 B1 * | 10/2002 | Honjoh ......................... | 348/36 |
| 6,466,618 B1 * | 10/2002 | Messing et al. ........ | 375/240.01 |
| 6,535,617 B1 | 3/2003 | Hannigan et al. | |
| 6,570,613 B1 * | 5/2003 | Howell ..................... | 348/219.1 |
| 6,590,996 B1 | 7/2003 | Reed et al. | |
| 6,614,914 B1 | 9/2003 | Rhoads et al. | |
| 6,625,297 B1 | 9/2003 | Bradley | |
| 6,636,551 B1 * | 10/2003 | Ikeda et al. ................. | 375/130 |
| 6,683,966 B1 * | 1/2004 | Tian et al. ................... | 382/100 |
| 2002/0041761 A1 * | 4/2002 | Glotzbach et al. .......... | 396/429 |
| 2002/0136429 A1 * | 9/2002 | Stach et al. ................. | 382/100 |
| 2003/0025814 A1 * | 2/2003 | Hunter et al. ............... | 348/272 |
| 2003/0071905 A1 * | 4/2003 | Yamasaki .................... | 348/239 |
| 2004/0008866 A1 * | 1/2004 | Rhoads et al. .............. | 382/100 |

FOREIGN PATENT DOCUMENTS

| WO | WO0139016 | 5/2001 |
|---|---|---|
| WO | WO0141056 | 6/2001 |

\* cited by examiner

Primary Examiner—Jingge Wu
Assistant Examiner—Patrick Edwards

(57) ABSTRACT

Slight camera movement between capture of successive images is advantageously utilized to minimize or eliminate the need to interpolate in order to fill in the "holes" in a Bayer pattern. The captured color values from multiple appropriately positioned images are used to fill these holes. For example, instead of interpolating the value of red for the second pixel position on the first row of a Bayer pattern, an image is selected which is positioned one pixel to the right of the first image, and the red vales from this image are used for the red values of the second pixel on the first line. Values of the pixels in multiple images which are appropriately aligned to each pixel position are averaged to generate a better value for each pixel position. Information carried by a digital watermark (either alone or together with other techniques) is used to determine the alignment of the images. Images are selected which are positioned so that corresponding pixels fall within a specified tolerance from a location in a Bayer pattern. The pixel values of the images which fall within the specified tolerance of each pixel position in a Bayer pattern are selected and used for the alignment.

23 Claims, 4 Drawing Sheets

Figure 2

| R | G | R | G | R | G | R | G | R | G | R | G | R | G | R | G | R | G |
|---|---|---|---|---|---|---|---|---|---|---|---|---|---|---|---|---|---|
| G | B | G | B | G | B | G | B | G | B | G | B | G | B | G | B | G | B |
| R | G | R | G | R | G | R | G | R | G | R | G | R | G | R | G | R | G |
| G | B | G | B | G | B | G | B | G | B | G | B | G | B | G | B | G | B |
| R | G | R | G | R | G | R | G | R | G | R | G | R | G | R | G | R | G |
| G | B | G | B | G | B | G | B | G | B | G | B | G | B | G | B | G | B |
| R | G | R | G | R | G | R | G | R | G | R | G | R | G | R | G | R | G |
| G | B | G | B | G | B | G | B | G | B | G | B | G | B | G | B | G | B |
| R | G | R | G | R | G | R | G | R | G | R | G | R | G | R | G | R | G |
| G | B | G | B | G | B | G | B | G | B | G | B | G | B | G | B | G | B |
| R | G | R | G | R | G | R | G | R | G | R | G | R | G | R | G | R | G |
| G | B | G | B | G | B | G | B | G | B | G | B | G | B | G | B | G | B |
| R | G | R | G | R | G | R | G | R | G | R | G | R | G | R | G | R | G |
| G | B | G | B | G | B | G | B | G | B | G | B | G | B | G | B | G | B |

GENERATING SUPER RESOLUTION DIGITAL IMAGES

FIELD OF THE INVENTION

The present invention relates to digital images and more particularly to the acquisition and processing of digital images.

BACKGROUND OF THE INVENTION

The technology to detect and read digital watermarks that are embedded in images is well developed. For example see, U.S. Pat. No. 5,721,788, U.S. Pat. No. 5,745,604, U.S. Pat. No. 5,768,426 and U.S. Pat. No. 5,748,783. Programs for detecting and reading digital watermarks are included in various commercially available image editing programs such as Adobe Photoshop that is marketed by Adobe Corporation.

A digital watermark can more easily be detected and read from a high quality, high resolution image, than from a low quality or low resolution image. In some situations multiple images having similar picture content are available. There are known techniques for combining multiple low resolution images which have similar content in order to make one relatively high resolution image. Such a technique is, for example, described in U.S. Pat. No. 6,208,765. The system shown in U.S. Pat. No. 6,208,765 aligns images using a reference coordinate system. An enhanced image is then synthesized, and regions of image overlap (i.e. regions of similar image content in multiple images) have improved quality. The synthesis process combines information in overlapping regions to form an enhanced image that corrects many of the image impairments.

Inexpensive low resolution cameras designed for connection to personal computers are in widespread use. Such cameras are herein referred to as PC cameras. PC cameras generally capture pixels in what is often termed a "Bayer pattern". A Bayer pattern is a four pixel square where only one color is captured for each pixel. The colors captured for the two pixels on the first line are red and green. The colors captured for the two pixels on the second line are green and blue. Interpolation is used to calculate three colors for each pixel position. The positions in the Bayer pattern where values of a colors are calculated rather than actually measured are herein termed "holes".

If a camera which uses pixel interpolation is used to acquire a digital image of a watermarked physical image, the pixel interpolation may make it more difficult to accurately read the watermark from the acquired digital image. However, with cameras such as PC cameras, it is easy to obtain multiple images which have almost identical content. The present invention is directed to using such multiple images to minimize or eliminate the need to interpolate to obtain a high resolution image.

SUMMARY OF THE PRESENT INVENTION

The present invention is directed to producing a high resolution image from multiple images which have similar content. Where a camera such as a PC camera is used to acquire a digital image, in general, the camera will have slightly moved between when successive images are captured. With the present invention, such slight camera movement between when successive images are captured is advantageously utilized to minimize or eliminate the need to interpolate in order to fill in the "holes" in a Bayer pattern.

With the present invention, the captured color values from multiple appropriately positioned images are used to fill in the "holes" in a Bayer pattern. For example, instead of interpolating the value of red for the second pixel position on the first row of a Bayer pattern, an image is selected which is positioned one pixel to the right of the first image, and the red values from this image are used for the red values of the second pixel on the first line. Furthermore, the value of the pixels in multiple images which are appropriately aligned to each pixel position can be averaged to generate a better value for each pixel position.

With the present invention, information carried by a digital watermark (either alone or together with other techniques) is used to determine the alignment of the images. Images are selected which are positioned so that corresponding pixels fall within a specified tolerance from a location in a Bayer pattern. That is, images are selected that are within a specified tolerance of one pixel to the right or one pixel down from a reference frame. The pixel values of the images which fall within the specified tolerance of each pixel position in a Bayer pattern are selected and combined to form a high resolution image.

BRIEF DESCRIPTION OF THE DRAWINGS

FIG. 2 illustrates the Bayer patterns in an image.

DETAILED DESCRIPTION

Figure 1:
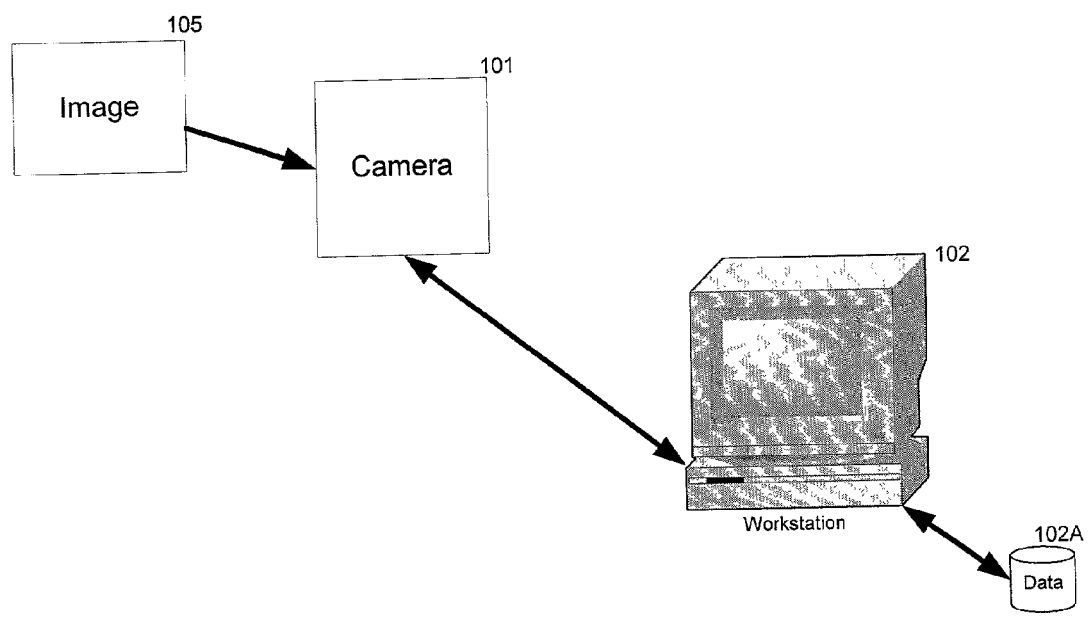
FIG. 1 illustrates a system for capturing multiple images which have similar content.

The first preferred embodiment of the invention utilizes the invention to facilitate reading digital watermarks from images captured by an inexpensive camera that is connected to a personal computer. FIG. 1 is an overall diagram of the system used to practice the first embodiment of invention.

The system shown in FIG. 1 includes a camera 101 connected to a personal computer 102. The computer 102 has a storage system 102A that stores programs and images. The camera 101 is directed at a physical image 105. The physical image 105 includes a digital watermark. The watermark could for example have been embedded in image 105 using the commercially available image editing program Adobe Photoshop. As is conventional with watermarks embedded with the Adobe Photoshop program, the digital watermark embedded in image 105 includes a "grid signal" and a "payload" signal that carries digital data.

Watermark reading programs, such as that included in the Adobe Photoshop program, use the grid signal to align and scale a captured image prior to reading the payload data from the watermark. In the frequency plane, (i.e. when the frequency of the grid signal is examined) the grid signal forms a recognizable pattern. The location and shape of this pattern indicates the rotation and scale of the image. When the image is adjusted to the correct rotation and scale, the size and location of the "watermark tile" (i.e. the redundant pattern in the image that carries the watermark) is such that watermark payload signal can be easily read.

The camera 101 can for example be the camera marketed by the Intel Corporation under the trademark "Intel PC Camera Pro Pack" Such a camera is relatively inexpensive and it produces an image with a 640 by 480 resolution. The camera has detectors positioned in a 640 by 480 configuration; however, each detector only captures one color. The color captured by each detector is that specified by a Bayer pattern. FIG. 2 illustrates how colors are captured in a Bayer pattern. There is a "hole" for each color not captured at a particular location. In the prior art, interpolation is used to determine the values of the colors for the "holes" in the Bayer pattern. With the present invention interpolation is not used to fill in the holes in the Bayer pattern.

It is possible to read a watermark from an image captured by a camera when interpolation is used to fill in the holes in a Bayer pattern. However, when interpolation is used to fill in the holes in a Bayer pattern, the camera must be correctly positioned (i.e. within a relatively small tolerance) with respect to the image and in some situations, several attempts to read an image may be required. The present invention is directed to making it easier to read digital watermarks from images captured by a relatively low resolution camera.

The conventional PC camera 101 can capture individual images or it can capture multiple images at a rate of up to 30 frames per second. The camera 101 is controlled by a computer program. With the present invention, values from multiple images are used to fill in the holes in a Bayer pattern to create a relatively high resolution image.

Figure 3:
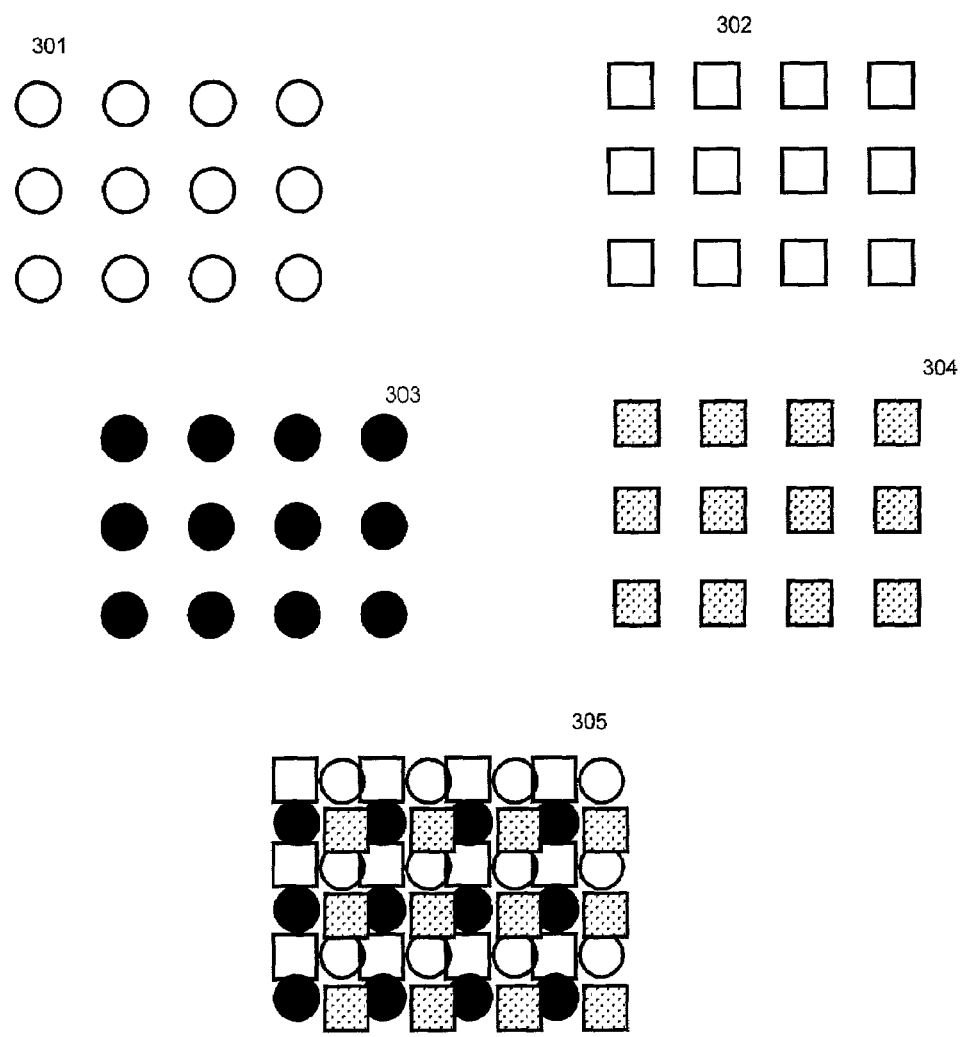
FIG. 3 illustrates how four low images can be combined to fill in the holes in a Bayer pattern without using interpolation.

FIG. 3 illustrates (in a greatly exaggerated form) how the red color from four relatively low resolution images 301 to 304 can be combined into the red color for one relatively high resolution image. The red pixels in image 301 are represented by outline circles, the red pixels in image 302 are represented by outline squares, the red pixels in image 303 are represented by solid circles and, the red pixels in image 304 are represented by solid squares. Only the red pixels (i.e. the pixels in the upper left hand corner of a Bayer square are shown in FIG. 3. It is should be understood that the other pixels are handled in a similar manner. Furthermore, FIG. 3 only shows a small number of pixels; naturally in an actual image there would be many such pixels.

The four images 301 to 304 are combined as indicated by the alternating squares and circles in image 305. In order for the process to produce a useful result, the images must be aligned, so that corresponding pixels from the various images are next to each other, one pixel to the right and/or one pixel down as shown in FIG. 3. The alignment must be within a certain tolerance which in this embodiment is one tenth of a pixel width. If the initial images have a resolution of 640 by 480 as produced by the Intel PC camera, and if the image is ten inches square, the pixels must be aligned to the locations in a Bayer pattern to within 0.012 inches. A very slight movement of the camera which captured the images could produce images so positioned.

With the present invention, the camera 101 is used to capture multiple images. For example in one second it can capture 30 images. The images are captured at a high frame rate so that the relative location of the physical image 105 and the camera are substantially (but not exactly) the same for all images.

As an example, consider the red pixel in a Bayer square and consider a corresponding pixel (herein called the reference pixel) in each of the 30 images captured during a one second interval. With the present invention the 30 images are divided into five categories. (for reference the four positions in a Bayer Square are herein referred to as positions 1 to 4).

1) Those images within 0.1 pixel of position 1 of the Bayer square.
2) Those images within 0.1 pixel of position 2 of the Bayer square.
3) Those images within 0.1 pixel of position 3 of the Bayer square.
4) Those images within 0.1 pixel of position 4 of the Bayer square.
5) The remaining images.

The pixel values in the sets of images designated 1, 2, 3, and 4 above are averaged generating four images that will be termed the four "averaged" images. The four averaged images are combined into one image as indicated in FIG. 3. That is, images 301 to 304 represent four averaged images.

In some situations, there may not be images found which are located in each of the desired positions. If there are no images in one of the categories, the other averaged images are combined and the fourth pixel position is determined by interpolated in accordance with the prior art.

Figure 4:
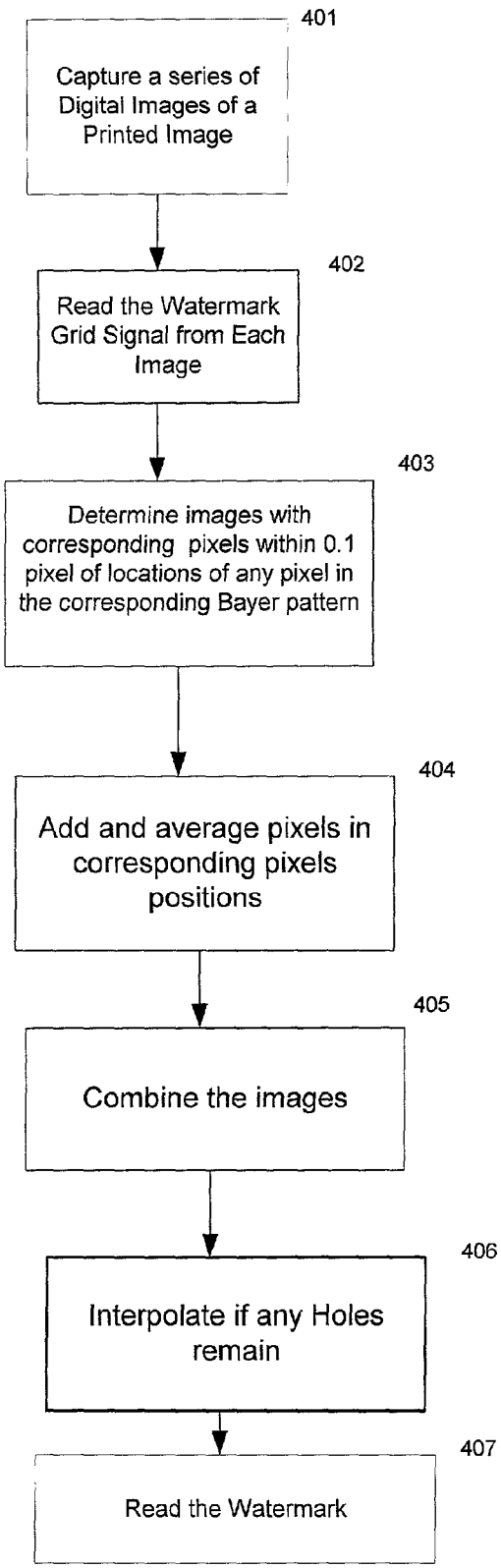
FIG. 4 is a flow diagram illustrating the operation of the invention.

FIG. 4 is a block diagram of a computer program which performs the operations of the present invention. As indicated by block 401, a series of images are captured with a PC camera. For example thirty images could be captured over a one second period. The operator will try to hold the camera such that the relative position of the camera and the printed image remain constant; however, there will almost always be some movement. Note, that the amount of movement that is relevant to this invention is the size of a pixel.

Next the watermark grid signal is read from each image and the relative position of each image is determined. As indicated by block 403, the images are divided into five categories as follows:

1) Those images within 0.1 pixel of position 1 of the Bayer square.
2) Those images within 0.1 pixel of position 2 of the Bayer square.
3) Those images within 0.1 pixel of position 3 of the Bayer square.
4) Those images within 0.1 pixel of position 4 of the Bayer square.
5) The remaining images.

Next as indicated by block 404, the pixel values from the images in each of the first categories are averaged to generate four images with average pixel values. The four images with average pixel value are next combined into one image as indicated by block 405. The combination is as shown in FIG. 3.

If any holes remain in the Bayer blocks, these holes are filled in by interpolation in accordance with the prior art as indicated by block 406. The above described how the "red" color for each pixel in the high resolution image is determined. The blue color for each pixel is determined in a similar manner. The green pixels are also handled similarly; however, it is noted that for the green color there are two acquired pixels in each Bayer square, thus, there are less "holes" in the green color.

Finally, as indicated by block 407, the watermark payload data is read from the combined image in a conventional manner.

It is noted that in the first embodiment of the invention, a conventional watermark grid signal is used to align the images. In alternate embodiments, any reference signal which is inserted into the image can be used for alignment. For example a pseudo random noise pattern with good correlation properties or fiducial marks of some kind can be used. Preferably, the reference signal added to an image should not be visible to the human eye.

It is also noted that in the first embodiment described above only a watermark grid signal is used to align the images. In alternate embodiments, the alignment technique described herein can be used together with other known image alignment techniques, such as correlating image content, to align the images. Thus both a hidden reference signal as described with reference to the first embodiment of the invention and image content can be used to align images. The image content would be used to align the images as described in the prior art. The use of a combination of techniques in some situations will produce better alignment than the use of a single alignment technique.

In the embodiment shown, the images are combined in accordance with the positions of a Bayer square. It should be understood that other color patterns and other patterns of positions could be used in alternate embodiments.

While the invention has been shown and described with respect to preferred embodiments thereof, it should be understood that wide variety of changes in form and design can be made without departing from the spirit and scope of the

We claim:

1. A method of generating a high resolution image from a set of nearly identical low resolution images, each of which contains a reference signal, the method comprising:
   identifying said reference signal in each of said low resolution images to relate the locations of said images,
   identifying a first group of said low resolution images having red image information at a location most closely aligned with a first position in said high resolution image;
   identifying a second, different, group of said low resolution images having red image information at a location most closely aligned with a second, different, position in said high resolution image;
   processing the red image information from said first group of images to generate red data for the first position in said high resolution image; and
   processing the red image information from said second group of images to generate red data for the second position in said high resolution image.

2. The method recited in claim 1 wherein the first and second positions correspond to positions in a Bayer square.

3. The method in claim 1 wherein pixels in said low resolution images have colors in accordance with a Bayer square.

4. The method recited in claim 1 wherein said reference signal comprises a watermark signal.

5. The method of claim 1 wherein none of the low resolution images in the first group of images is included in the second group of images.

6. A method of generating a high resolution image from a series of nearly identical low resolution images, each of which contains a reference signal, the method comprising:
   reading said reference signal from each of said low resolution images to determine alignment of pixels in the image,
   selecting images whose pixels are within a specified tolerance from specified positions, and
   combining the selected images to generate a high resolution image,
   wherein said reference signal comprises a watermark grid signal.

7. A system for generating a high resolution image from a series of nearly identical relatively low resolution images, the system including:
   a watermark reading program for reading a watermark grid signal from each of said low resolution images to determine alignment of the pixels in the low resolution images relative to positions in a Bayer square,
   an image selection program for selecting the low resolution images whose pixels are within a specified tolerance from each position in the Bayer square, and
   an image combination program for combining the selected low resolution images to generate a high resolution image.

8. A method of generating a high resolution image from a plurality of low resolution images, the method comprising,
   capturing a plurality of low resolution electronic images of a subject, the subject defining a hidden reference signal,
   using said reference signal to determine alignment of a plurality of said low resolution images, and
   combining at least some of said low resolution images into a high resolution image,
   wherein said reference signal comprises a watermark grid signal.

9. A method of generating a high resolution image from a plurality of low resolution images, the method comprising:
   capturing a series of low resolution images, each of which contains a reference signal,
   reading said reference signal from each of said low resolution images,
   aligning said low resolution images in accordance with said reference signal, and
   combining at least some of said aligned low resolution images into a high resolution image,
   wherein said reference signal comprises a watermark grid signal.

10. A method comprising:
    capturing first and second frames of similar image data using a common 2D image sensor that is subject to slight movement between frames, said sensor comprising a geometrical pattern of sensor elements, each element sensing light of one of at least first or second colors, wherein certain locations in said 2D sensor do not sense light of the first color, resulting in unknown first color information at various locations in the frames of image data captured by said sensor;
    determining position information relating position of the first image frame to the second image frame, said determining including decoding a signal steganographically encoded data in the first image frame, and decoding a signal steganographically encoded in the second image frame; and
    generating a composite image frame in which said unknown first color information at one of said various locations in the first frame of image data is mitigated by reference to first color information from the second image frame that is determined to correspond to said one location.

11. The method of claim 10 in which said determining includes correlating pattern data in said first and second image frames.

12. The method of claim 11 in which said determining makes use of signals steganographically encoded in the first and second image frames, and also makes use of correlating visible image content.

13. The method of claim 12 wherein said visible image content comprises fiducial marks provided on a subject being imaged.

14. A method comprising:
    capturing a first frame of image data using a 2D sensor, and capturing a second frame of image data using said same 2D sensor;

sensing a hidden watermark signal, useful in determining image rotation and scaling, in each of said frames of image data; and by reference to said sensed hidden watermark signal, combining data from said first and second frames to produce an enhanced frame of image data.

15. A method of generating a high resolution image from a set of nearly identical low resolution images, the method comprising:

capturing low resolution images from a subject, the subject having previously been deliberately marked with a marker signal to facilitate machine processing of images captured therefrom;

identifying said marker signal in each of said low resolution images to relate locations of said images;

identifying a first group of said low resolution images having image information of a first primary color at a location most closely aligned with a first position in said high resolution image;

identifying a second group of said low resolution images having image information of a second, different, primary color at a location most closely aligned with said first position in said high resolution image;

processing the image information of the first primary color from said first group of images to generate data of said first primary color for the position in said high resolution image; and processing the image information of the second primary color from said second group of images to generate data of said second primary color for said first position in said high resolution image.

16. The method of claim 15 wherein none of the low resolution images in the first group of images is included in the second group of images.

17. The method of claim 15 wherein at least one of said low resolution images is included in neither said first nor second groups.

18. A method of generating a high resolution image from a plurality of low resolution images, the method comprising, capturing a plurality of low resolution electronic images of a subject, the subject defining a hidden reference signal, using said reference signal to determine alignment of a plurality of said low resolution images, and combining data from at least some of said low resolution images into a high resolution image;

wherein the subject comprises a printed substrate having the hidden reference signal formed thereon.

19. The method recited in claim 18 wherein said low resolution images are aligned in accordance with the holes in a Bayer square.

20. The method recited in claim 18 wherein a plurality of low resolution images are captured and only those low resolution images which align to within a specified tolerance with holes in a Bayer square are used to form said composite image.

21. The method of claim 18 wherein the subject comprises a printed article, and said print defines the hidden reference signal.

22. The method of claim 21 wherein the article comprises printed artwork encoded with a digital watermark, the hidden reference signal comprising said watermark.

23. The method of claim 18 that includes combining data from some, but not all, of said low resolution images into a high resolution image.

* * * * *